Patented June 5, 1951

2,555,656

UNITED STATES PATENT OFFICE 2,555,656

PROCESS OF PRODUCING A CALCIUM PHOSPHATE

Mathijs H. R. J. Plusje, Beek, and Hendrik de Bruijn, Geleen, Netherlands, assignors to De Directie van de Staatsmijnen in Limburg, Heerlen, Netherlands No Drawing. Application April 8, 1947, Serial No. 740,258. In the Netherlands April 4, 1941

Section 1, Public Law 690, August 8, 1946
Patent expires April 4, 1961

7 Claims. (Cl. 23—109)

This invention relates to processes for the production of new phosphate materials. More particularly, it is concerned with the production of calcium phosphates that are insoluble in water, but soluble in solutions containing citrate ions, e. g., citric acid or citrate solutions, and which are useful as ingredients in fertilizers.

Naturally occurring phosphate materials composed predominantly of tricalcium phosphate, e. g., Florida plate or pebble phosphate rock, Tennessee brown rock phosphate, apatites, etc., referred to hereinafter as raw phosphate materials, in their raw state are not generally useful as fertilizer materials because of the fact that plants cannot assimilate them since they are highly insoluble. However, these susbtances can be converted by various means into products which are useful as fertilizers or as ingredients for fertilizers. Thus, these raw phosphate materials may be treated with strong mineral acids so as to render the phosphate material soluble or utilizable by the plants. The acid-treated substances may be further treated by various procedures and reagents to further modify their characteristics. An example of one such known method is that described in German Patent No. 332,115, in which a mixture of tricalcium phosphate and calcium carbonate is prepared by precipitating the mixture with ammonia and carbon dioxide from an acidic solution obtained by decomposing raw phosphate material with a strong mineral acid. As a general feature of all such methods employed heretofore, these procedures produce materials of limited or partial solubility so that their entire available calcium and phosphate content is not utilizable by plant life when the materials are used as fertilizers or fertilizer ingredients.

A principal object of this invention is the provision of a new process for the production of phosphate materials and a new type of a calcium phosphate. A further object is the provision of a calcium phosphate which is insoluble in water, but is substantially completely soluble in citric acid and/or citrate solutions and a process for the production of such materials. Another object is to provide improvements in the phosphate material treatment procedures of the prior art. Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

These objects are accomplished according to the present invention by treating solutions of raw phosphate material, such as those prepared by decomposition of the raw phosphates with strong mineral acids, with a precipitating reagent, such as ammonia and carbon dioxide, potassium carbonate or sodium bicarbonate, while the molecular ratio between the dissolved CaO and the dissolved $P_2O_5$ is greater than 3.3, and preferably is between 3.6 and 4.0, with the pH of the reagent mixture during the treatment with the precipitating reagent being maintained between 6 and 8 and, thereafter, recovering the precipitated calcium phosphate.

The success of the present invention depends to a large extent upon the discovery that, if the molecular ratio of CaO to $P_2O_5$ in solutions containing calcium and phosphate ions is maintained above a certain critical value, while the pH of the solutions are also maintained within certain critical limits during the treatment with a precipitating reagent capable of supplying carbonate ions to the treated solution, there will be obtained a product corresponding to the formula $Ca_{10}(PO_4)_6CO_3$ and that this product will be susbtantially completely soluble in citric acid and/or citrate solutions, although it is insoluble in water. Comparison of the formula of naturally occurring apatites, specially carbapatite, with the formula for our new products will show that these new products correspond as to their compositions to these naturally occurring susbtances. However, it has been found further that there is a surprising difference between the products produced by this invention and the naturally occurring apatites. Likewise, these products exhibit properties which differentiate them susbtantially from simple mechanical mixtures of tricalcium phosphate and calcium carbonate. The difference between these various materials may be appreciated from the following comparative data upon the solubility of the individual materials in a citrate solution:

| Material | Solubility |
|---|---|
| | Per cent |
| Technical tricalcium phosphate | 60-70 |
| Tricalcium phosphate (precipitated in the cold from pure reagents) | 76 |
| A mixture of the last-named tricalcium phosphate with calcium carbonate in such a proportion, that the ratio $CaO/P_2O_5$ is the same as in the compound $Ca_{10}(PO_4)_6.CO_3$ | 79 |
| The product of this invention $Ca_{10}(PO_4)_6.CO_3$ | 100 |

The difference between the product of this invention and mechanical mixtures of tricalcium phosphate and calcium carbonate, as indicated by the above data, is apparently due to the fact that the phosphates and carbonates in our products are actually combined to form a true chemical compound. This fact can be demonstrated in several ways.

If the precipitates of this invention are heated at 900° C. for two hours and, thereafter, washed with water, a residue is obtained in which the ratio of CaO to $P_2O_5$ is equal to 3.33, even when this ratio is greater than 3.33 before the heating. This residue is composed of the compound $Ca_{10}(PO_4)_6(OH)_2$. In comparison, if a mechanical mixture of tricalcium phosphate and calcium carbonate of the same calcium and phosphate analysis is heated under comparable conditions and then, subsequently, washed, a residue is obtained in which the ratio of CaO to $P_2O_5$ is approximately 3.0. During the heating $CO_2$ is expelled and during the washing CaO is eliminated. Consequently, it will be observed that with mechanical mixtures of tricalcium phosphate and calcium carbonate, the latter substance can be eliminated by heating and washing. In contrast, the elimination of calcium carbonate from the product of this invention can only be eliminated by heating and washing, insofar as there is more calcium carbonate than corresponds to the ratio CaO to $P_2O_5$ equal to 3.33.

The fact that the phosphates and carbonates in the subject products are combined in chemical combination can also be demonstrated by adsorption experiments with dye-stuffs. Thus, when calcium carbonate is precipitated from a solution containing Java-green dye, the dye is adsorbed by the precipitate which becomes highly colored. Tricalcium phosphate does not exhibit this property of dye adsorption. It has been discovered that the phosphate precipitate in accordance with the present process will adsorb Java-green dye when the ratio of CaO to $P_2O_5$ in the precipitate is greater than 3.333, whereas when this ratio is 3.33 or below, there is no dye adsorption. This is evidence that the calcium carbonate in our products occurs in chemical combination with the phosphate since, if the carbonate appeared as free calcium carbonate, there would be dye adsorption.

The procedures and products of this invention may be more readily comprehended by reference to the following illustrative example, in which all parts are by weight.

Example

One thousand parts of a natural Florida phosphate containing 46% CaO and 38% $P_2O_5$ are treated with 2075 parts of 53% nitric acid to form an acidic solution of decomposed raw phosphate material containing dissolved CaO and $P_2O_5$ in a ratio of 3.07. This acidic solution is then subjected to a step of partial neutralization in order to precipitate dicalcium phosphate and raise the CaO to $P_2O_5$ ratio of the solution. Thus, 75 parts of ammonia are introduced at 80° C. into the total solution with the result that 241 parts of dicalcium phosphate are precipitated and removed by filtration.

By simple calculation it will be seen that 99 parts of CaO and 126 parts of $P_2O_5$ have been removed by the partial neutralization step. Thus, from the original 1000 parts of phosphate material, there is now left in the partially neutralized solution 361 parts of CaO and 254 parts of $P_2O_5$. Hence, the ratio of CaO to $P_2O_5$ is now 3.6.

The partially neutralized solution from which the dicalcium phosphate has been removed by filtration is gradually introduced into a body of previously neutralized solution having a pH equal to 7. Simultaneously, with this addition, there is also incorporated into the reaction mixture 222 parts of $NH_3$ and 47 parts of $CO_2$ with proper control so that the pH of the reaction mixture is constantly maintained at a value of 7. Throughout the reaction, the temperature of the medium is maintained at 80° C.

A calcium phosphate in an amount of 662 parts and containing 38.4% $P_2O_5$ (i. e., 92.8% $Ca_{10}(PO_4)_6CO_3$) is obtained. By concentrating the liquid without separation of this precipitate and drying the residue until it contains 1% moisture, a compound fertilizer is obtained having 23.5% nitrogen and 12.2% $P_2O_5$.

Fertilizing experiments carried out with the calcium phosphate products of this invention and fertilizers compounded therefrom demonstrate the materials to have most favorable characteristics, especially in acid soils. Such experiments have been conducted in peat-moor, sandy soil and sandy clay and in all of these types of soils our materials perform very favorably.

Various types of materials containing calcium and phosphates in appreciable quantities may be used in carrying out the present process. Obviously, materials in which the calcium and phosphate content are high are preferred.

Examples of suitable materials for this purpose are Florida pebble or plate rock phosphate, Canadian apatite, Tennessee brown rock phosphate, Curacao phosphate, Makatea phosphate, and similar natural products. Likewise, mixtures of the materials may be used or synthetically produced or by-product calcium phosphate products or mixtures thereof may be utilized. Such materials have been referred to throughout the specification and in the pending claims as raw phosphate materials.

As a preliminary step in our process, the raw phosphate material is decomposed by operation of strong acidic materials. Most suitable for this purpose are the strong mineral acids, such as nitric, sulphuric, hydrochloric or phosphoric acids.

As has been indicated above, the successful operation of the process depends upon having in the reaction solution a ratio of CaO to $P_2O_5$ greater than 3.3, preferably between 3.6 and 4.0, prior to the precipitation of our novel products. It is possible to obtain raw phosphate materials or mixtures of raw phosphates which possess the required ratio. However, if such materials are not used, it is necessary to effect an adjustment of the ratio. This may be done by adding suitable material, such as calcium oxide, to the raw phosphate material prior to decomposition with acid, but this, of course, is uneconomical because of acid consumption. Instead, the ratio may be adjusted after the raw phosphate has been subjected to the acid dissolving treatment by (1) the addition of calcium salt, such as calcium nitrate to the acidic solution, or (2) by the precipitation of mono- or dicalcium phosphate or mixtures thereof, from the acid liquid as illustrated in the example above.

When the latter method is used to adjust the subject ratio, it is preferable to separate the mono- or dicalcium phosphates from the solution by filtration, although, if desired, the subsequent step of precipitation of our novel products may be accomplished without this separation.

Proper adjustment of the pH of the solution during the final precipitation step is important. Thus, if the pH of the solution during the introduction of the precipitating reagent, such as ammonia and carbon dioxide, is permitted to go below 6, a product is obtained which is substantially less soluble than the products of this invention. This appears to be due to the formation of hydroxyapatite. On the other hand, if the pH during this addition is permitted to exceed 8, a precipitate is obtained in which the CaO to $P_2O_5$ ratio is much higher than in the products of this invention, apparently because $P_2O_5$ is not precipitated at this pH.

Various substances which furnish a carbonate ion to the solution when reacted therewith, may be used as the reagents to precipitate the products of this invention. The example above illustrates the simultaneous use of ammonia and carbon dioxide for this purpose. Water-soluble carbonates and bicarbonates may also be employed, such as ammonia carbonate, potassium carbonate, sodium bicarbonate, potassium bicarbonate and the like.

After the product of this invention has been precipitated, it may be separated by filtration, and the remaining mother-liquor may be concentrated to give the ammonium salt of the acid which was used for decomposing the raw phosphate. Another way of working up the liquid, containing the precipitate, consists in concentrating it as a whole, by evaporation. This method yields a concentrated, mixed fertilizer, containing the phosphate and an ammonium salt, e. g., ammonium nitrate. Also potassium salts may be added to yield a balanced fertilizer.

In the evaporation step, profit may be derived from the heat developed in neutralizing the acid. It is desirable to control the pH during the evaporation process, and to prevent its going down below 6 by adding ammonia.

We claim:

1. A process for the production of a calcium phosphate product corresponding to the formula $Ca_{10}(PO_4)_6CO_3$ which is insoluble in water, but soluble in citric acid and citrate solutions, which comprises the steps of, introducing continuously and simultaneously into a body of previously neutralized reaction mass having a pH value of 6–8 separate streams of an acid solution of raw phosphate material having a molecular ratio of dissolved CaO to dissolved $P_2O_5$ greater than 3.3, an alkaline neutralizing agent and a material selected from the group consisting of carbon dioxide, water soluble carbonates and water soluble bicarbonates, regulating the introduction of said streams so as to maintain continuously the pH of the reaction mixture at between 6 and 8, and thereby precipitating a calcium phosphate product as defined above, and recovering the precipitated calcium phosphate.

2. The process of claim 1, wherein said ratio of CaO to $P_2O_5$ is between 3.6 and 4.0.

3. The process of claim 1, wherein said pH is 7.

4. A process for the production of a calcium phosphate product corresponding to the formula $Ca_{10}(PO_4)_6CO_3$ which is insoluble in water, but soluble in citric acid and citrate solutions, which comprises the steps of, reacting a raw calcium phosphate material with a mineral acid, adjusting the molecular ratio of dissolved CaO to dissolved $P_2O_5$ in the resulting solution to between 3.6 and 4.0, introducing continuously and simultaneously into a body of previously neutralized reaction mass having a pH value of 6–8 separate streams of the aforesaid adjusted acid solution, an alkaline neutralizing agent and a material selected from the group consisting of carbon dioxide, water soluble carbonates and water soluble bicarbonates, regulating the introduction of said streams so as to maintain continuously the pH of the reaction mixture at between 6 and 8, and thereby precipitating a calcium phosphate product as defined above, and recovering the precipitated calcium phosphate.

5. The process of claim 2, wherein the CaO to $P_2O_5$ ratio is adjusted by precipitating a calcium phosphate from the group consisting of mono-calcium phosphate, dicalcium phosphate and mixtures thereof, from the raw phosphate solution.

6. The process of claim 2, wherein said mineral acid is nitric acid.

7. A process for the production of a calcium phosphate product, having a composition corresponding to 10 mols Ca, 6 mols $PO_4$ and 1 mol $CO_3$, which is insoluble in water, but soluble in both citric acid and citrate solutions, which comprises the steps of, introducing continuously and simultaneously into a body of previously neutralized reaction mass having a pH value of 6–8 separate streams of an acid solution of raw phosphate material having a molecular ratio of dissolved CaO to dissolved $P_2O_5$ greater than 3.3, ammonia and carbon dioxide, regulating the introduction of said streams so as to maintain continuously the pH of the reaction mixture at between 6 and 8, and thereby precipitating a calcium phosphate product as defined above, and recovering the precipitated calcium phosphate.

MATHIJS H. R. J. PLUSJE.
HENDRIK DE BRUIJN.

REFERENCES CITED

The following references are of record in the file of this patent:

UNITED STATES PATENTS

| Number | Name | Date |
| --- | --- | --- |
| 1,809,473 | Colbjornsen | June 9, 1931 |
| 1,849,703 | Boller | Mar. 15, 1932 |
| 2,114,600 | Larsson | Apr. 19, 1938 |
| 2,417,462 | Adler | Mar. 18, 1947 |

FOREIGN PATENTS

| Number | Country | Date |
| --- | --- | --- |
| 430,380 | Great Britain | June 18, 1935 |

OTHER REFERENCES

MacIntire et al., Industrial & Engineering Chemistry, vol. 37, Feb. 1945, pages 164–9.